3,408,795
SEALING ARRANGEMENT FOR ROLL-TYPE FILTERS
Alan E. Revell, Louisville, and Orville C. Parrott, Fern Creek, Ky., assignors to American Air Filter Company, Inc., Louisville, Ky., a corporation of Delaware
Filed June 14, 1967, Ser. No. 645,931
3 Claims. (Cl. 55—354)

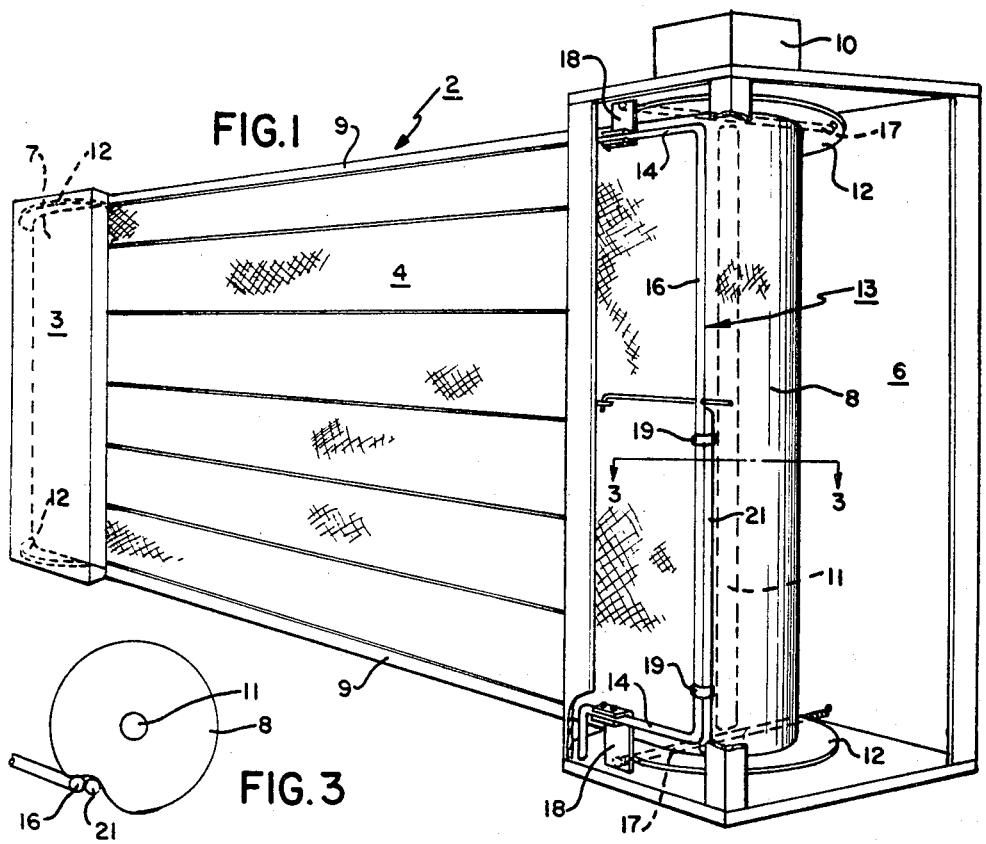
FIG.1
FIG.3
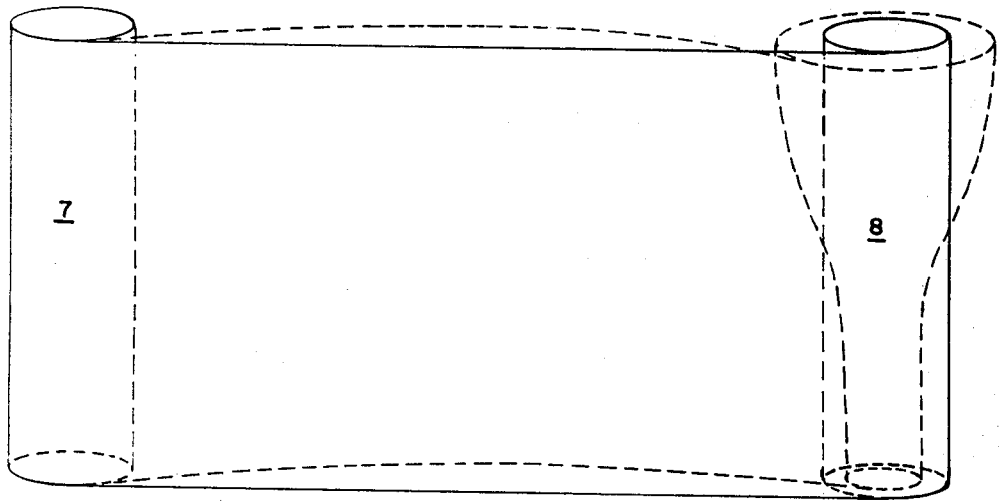
FIG.2
INVENTORS
ALAN E. REVELL
ORVILLE C. PARROTT
BY
Ralph B. Brick
ATTORNEY United States Patent Office 3,408,795
Patented Nov. 5, 1968

ABSTRACT OF THE DISCLOSURE

An improved sealing arrangement in a roll-type filter assembly wherein a filter medium edge has a tendency to pull away from an edge seal in the filtering section including means cooperating with the filter medium take-up roll to place such filter medium edge under greater tension as it passes through such edge seal to maintain it in sealed position.

Background of the invention

The present invention relates to fluid filtration and finds particular utility in the gas separation art where roll-type filter assemblies are employed which move filter medium from a supply section through a gas treating section to a take-up or rewind section.

Various filter arrangements are known in the art of the type which advance filter medium from a roll in a supply section through a gas treating section to a take-up roll in a rewind section. In these filter arrangements, opposed edge seals are provided to engage the filter medium edges in the gas treating section to avoid bypassing of the gases to be treated around the filter medium. Notwithstanding these edge seals, the edges of the filter medium have had a tendency to pull away therefrom, resulting in undesirable bypassing of the gas to be treated. This problem has been particularly critical in roll filters wherein filter medium is moved in a horizontal path with the weight of the medium and the particulate materials entrained thereby causing an upper edge seal break. The problem also arises in situations where the gas to be treated is introduced at an angle other than normal to the plane through which the inlet face of the filter medium passes so that the force exerted by the gas to be treated causes the medium to be pulled away from one of the two opposed edge seals.

Various arrangements have been used to avoid this problem, including constructions which have increased the edge seal breadth and which have attempted to tighten the seal with the edges of the filter medium. However, the past arrangements have been expensive and complex, often resulting in increased resistance to the gas stream to be treated and increased resistance to movement of the filter medium along its path across the gas treating section.

Summary of the invention

In accordance with the present invention, a new, useful, and unobvious roll-type filter arrangement is provided which is straightforward and economical in construction, operation, and maintenance, utilizing a minimum of materials and operating parts and requiring a minimum of time for installation in new units or as an adaptation to old units. Further, the present invention avoids the necessity of increasing the breadth of the edge seals and, at the same time, presents a minimum of additional drag on the filter medium as it is moved through the gas treating section.

Various other features of the present invention will become obvious to one skilled in the art upon reading the disclosure set forth hereinafter.

More particularly, the present invention provides an improved filter assembly housing comprising a supply storage section adapted to receive and support a web of filter medium in roll form; a gas treating section through which the filter medium can be advanced, the gas treating section having spaced opposed filter medium edge seals; a rewind section including a take-up spool to rewind the filter medium in roll form; and means cooperatively associated with the take-up spool to cause filter medium rolled thereupon to form as a take-up roll with at least one end thereof in outwardly flared attitude to be of greater diameter than that portion of the roll immediately adjacent thereto where by virtue of the flared end and the wrapping of the medium therearound, the edge of the filter medium associated with the flared end is placed under greater tension and is urged toward its edge seal as it passes through its edge seal of the gas treating section to more ably resist counteracting forces tending to pull the filter medium away from such edge seal.

It is to be understood that various changes can be made in the arrangement, form, and construction of the apparatus disclosed herein without departing from the scope or spirit of the present invention.

Referring to the drawing which discloses one advantageous embodiment of the present invention:

FIGURE 1 is a partially broken away perspective view of a roll-type filter disclosing a roll rewind section which includes the inventive sealing arrangement incorporated therewith;

FIGURE 2 is a schematic diagram overlay view disclosing the comparative paths of the filter medium with and without the inventive adjustment and for the purposes of illustration, neglecting the effects of the media and dust load weight; and FIGURE 3 is a cross-sectional view taken in a plane passing through line 3—3 of FIGURE 1.

Referring to FIGURE 1 of the drawing, a roll-type filter housing 2 is disclosed, this housing including roll support supply section 3, gas treating section 4, and roll support rewind section 6. Supply section 3 serves to receive and support a roll of filter material 7, disclosed in FIGURE 1 of the drawing in phantom line form and in FIGURE 2 of the drawing in solid line form. Roll 7 can be comprised of a web of suitable filter medium material such as fiber glass. Advantageously, it can be in compressed condition on roll 7 in supply section 3 to be expanded from the roll in filter section 4 and compressed again as a take-up roll 8 in rewind section 6. The web is progressively advanced through section 4 which includes spaced opposed edge seals 9 which frame a fluid stream passage through which the fluid to be treated must flow. Although not disclosed in detail, edge seals 9 can be of U-shaped cross section to provide inwardly directed opposed channels which serve to receive the side edges of the filter medium in sealing relationship therewith. A contaminant loaded web 7, after passing through gas treating section 4, is progressively advanced to rewind section 6 where it is wound onto take-up roll 8, which ultimately can be thrown away or reconditioned. A suitable drive motor and web metering control arrangement, known in the art and not described in detail, can be utilized to advance the medium progressively in the manner aforedescribed. The drive motor and web metering control equipment is positioned in housing 2 adjacent roll support rewind section 6 and is broadly referred to herein by reference numeral 10.

It is to be understood that, as is known in the art and therefore not shown in detail, clean roll of filter material 7, as well as take-up roll 8, is wound upon a spool or mandrel 11 as disclosed by the broken lines in FIGURE 1. The spool 11 has opposed end rims 12 and opposed projecting spindles (not shown) which nest with slots (also not shown) in the bearing unit of the roll support section.

It also is to be understood the spool and end rims can be made from any one of a number of suitable materials, and advantageously, a lightweight strong metal can be used.

Referring to FIGURE 1 of the drawing, it can be seen that as the filter medium is wound on take-up roll 8 in the rewind section 6, a U-shaped hold-down bar assembly 13 including a pair of opposed legs 14 and a base portion 16 extending therebetween is pivotally mounted by means of its opposed legs to the opposite side walls of housing 2 in the rewind section so that its base 16 is urged against roll 8 by means of coil springs 17. Each of the coil springs has one end connected to a leg 14 of the hold-down bar through a hinge assembly 18 mounted on the leg and at the other end is connected to a side wall of housing 2 in a suitable manner.

In accordance with the present invention, fastened to the base 16 of the hold-down bar 13 by means of spaced adjustable band clamps 19 is rod 21. Rod 21 is of a length substantially less than the length of base 16 and is positioned, in accordance with the present invention, closer to the rotational axis of spool 11 than is base 16 of the hold-down bar assembly. As a consequence, a greater pressure is applied to take-up roll 8 along a line removed from the upper end rim 12. Due to this arrangement, as the filter medium is wound upon take-up roll 8, roll 8 flares outwardly toward the upper end of rim 12 to take on the appearance of a truncated cone with the end adjacent upper end rim 12 being of greater diameter than that portion of the roll immediately adjacent thereto. Accordingly, by virtue of this truncated cone geometry with the wrapping of the filter medium therearound, the edge of the filter medium associated with such flared end of greater diameter is placed under greater tension and is urged toward its edge seal 9 as it passes through its edge seal 9 in the gas treating section (FIGURE 2). Since the apparatus of FIGURE 1 is of horizontal nature and since the weight of the medium and the contaminants entrained thereby in such an arrangement have a tendency to pull the medium away from the upper edge seal 9, the increased tension and upward urging serve as a counteracting means to maintain the medium in its proper sealed relationship. It is to be understood that the length of rod 21, its radial position on base 16, and its position relative the rotational axis of spool 11 (FIGURE 3) can be varied in accordance with the type and length of filter medium used, the orientation of housing 2, the breadth of the edge seal, and the results desired. In this connection and as can be seen in FIGURE 2, the location and extent of pressure must be such as to avoid overcompensation and a resulting breakout of the edge seal of the edge opposite that which was not of initial concern.

The invention claimed is:

1. An improved filter assembly comprising: an expansible-compressible web of filter medium in roll form; a housing having a supply storage section receiving and supporting said web of filter medium in roll form; a gas filtering section in said housing through which said filter medium is advanced, said gas filtering section having spaced opposed filter medium edge seals sealingly engaging the opposite edges of the portion of said web which is in said gas filtering section; a rewind section in said housing and including a take-up spool upon which said filter medium is rewound in roll form; means cooperatively associated with said take-up spool differentially compressing medium rolled upon said take-up spool along the longitudinal axis of said take-up spool and forming a take-up roll on said take-up spool with at least one end thereof in less compression than a portion immediately adjacent thereto and extending in outwardly flared attitude of greater diameter than the more compressed portion of the roll immediately adjacent thereto; the flared end formed by the wrapping of the medium around said take-up spool placing the edge of filter medium associated with the flared end and in said gas filtering section under greater tension than said portion of the roll immediately adjacent thereto in said gas filtering section and urging said edge toward its edge seal as it passes through its edge seal in the gas filtering section and more ably resisting counteracting forces tending to pull the filter medium away from the edge seal; and means operatively associated with said take-up spool for advancing said web of filter medium from said supply storage section through said gas filtering section and into roll form on said take-up spool.

2. The apparatus of claim 1, said means forming said rewound medium roll with one end in outwardly flared attitude comprising a filter medium hold-down member pivotally and resiliently mounted in said rewind section and in contoured engagement in compression contact against the peripheral surface of said medium rewound on said roll and applying greater pressure along a line removed from the flared end, the medium forming a truncated cone form extending in outwardly tapering form from said line to the flaring end.

3. The apparatus of claim 2, said hold-down member including an adjustable rod mounted at that portion of said hold-down member which contacts said take-up roll and applies pressure in said line removed from the flared end, said rod being radially adjustable relative the longitudinally extending rotational axis of said take-up spool to permit variations of pressure against said take-up roll.

References Cited

UNITED STATES PATENTS

| | | | |
|---|---|---|---|
| 2,808,899 | 10/1957 | Hofstetter | 55—354 |
| 2,867,326 | 1/1959 | Hirs | 210—387 X |
| 2,875,846 | 3/1959 | Yonkers | 55—354 X |
| 3,003,582 | 10/1961 | Palmore | 55—354 |
| 3,013,630 | 12/1961 | Palmore | 55—354 |
| 3,045,410 | 7/1962 | Floyd | 55—352 |
| 3,261,149 | 7/1966 | Althuser | 55—354 |
| 3,280,538 | 10/1966 | Schwarz | 55—354 |

FOREIGN PATENTS 20,134  12/1882  Germany.

OTHER REFERENCES

"Cambridge Auto-Roll," Bulletin 155B, Cambridge Filter Corporation (A), Syracuse, N.Y. 13201, © 1963, 8 pages.

"Electro-Roll," Bulletin 113, Cambridge Filter Corporation (B), 7645 7th North Road, Syracuse, N.Y. 13201, © 1964, 8 pages.

HARRY B. THORNTON, *Primary Examiner.*

D. TALBERT, JR., *Assistant Examiner.*